US012583476B2

(12) United States Patent
Molina Ramos et al.

(10) Patent No.: US 12,583,476 B2
(45) Date of Patent: Mar. 24, 2026

(54) METHOD FOR CONTROLLING AN AUTONOMOUS VEHICLE

(71) Applicant: RENAULT S.A.S., Boulogne Billancourt (FR)

(72) Inventors: Nievsabel Molina Ramos, Issy-les-Moulineaux (FR); Vicente Milanes, Madrid (ES); David Gonzalez Bautista, Saint Cyr l'Ecole (FR); Irene Cortes Lafuente, Saragossa (ES); Armando Astudillo Olalla, Madrid (ES)

(73) Assignee: AMPERE S.A.S., Boulogne Billancourt (FR)

( * ) Notice: Subject to any disclaimer, the term of this patent is extended or adjusted under 35 U.S.C. 154(b) by 160 days.

(21) Appl. No.: 18/558,958

(22) PCT Filed: Apr. 29, 2022

(86) PCT No.: PCT/EP2022/061576
§ 371 (c)(1),
(2) Date: Nov. 3, 2023

(87) PCT Pub. No.: WO2022/233739
PCT Pub. Date: Nov. 10, 2022

(65) Prior Publication Data
US 2024/0227852 A1 Jul. 11, 2024

(30) Foreign Application Priority Data

May 3, 2021 (FR) ...................................... 2104645

(51) Int. Cl.
*B60W 60/00* (2020.01)
*B60W 30/095* (2012.01)
*B60W 30/18* (2012.01)

(52) U.S. Cl.
CPC ...... *B60W 60/001* (2020.02); *B60W 30/0956* (2013.01); *B60W 30/18009* (2013.01);
(Continued)

(58) Field of Classification Search
CPC ........... B60W 60/001; B60W 30/0956; B60W 30/18009; B60W 2520/10;
(Continued)

(56) References Cited

U.S. PATENT DOCUMENTS

| | | | |
|---|---|---|---|
| 2017/0123428 A1* | 5/2017 | Levinson | ........... B60W 60/0011 |
| 2018/0208192 A1* | 7/2018 | Olsson | ................ B60T 8/17558 |

(Continued)

FOREIGN PATENT DOCUMENTS

DE     10 2018 113 007 A1     12/2018

OTHER PUBLICATIONS

International Search Report mailed on Jun. 27, 2022 in PCT/EP2022/061576 filed on Apr. 29, 2022 (3 pages).
(Continued)

*Primary Examiner* — Khoi H Tran
*Assistant Examiner* — Tristan J Greiner
(74) *Attorney, Agent, or Firm* — Oblon, McClelland, Maier & Neustadt, L.L.P.

(57) ABSTRACT

A method controls an autonomous vehicle equipped with at least one perception unit and a first map including stored digital data representing the actual infrastructure of the environment of the autonomous vehicle. The method includes defining a first trajectory of the autonomous vehicle and a first associated kinematic profile, detecting, from data transmitted by the perception unit, a situation to be optimized on a given segment of the first trajectory located in front of the autonomous vehicle, optimizing at least one element from the first map and the first kinematic profile, optimizing the first map including determining a local map (Continued)

on the given segment, and/or optimizing the first kinematic profile including a determination of a second kinematic profile associated with the given segment, and controlling the displacement of the autonomous vehicle over the given segment taking into account the local map and/or the second kinematic profile.

13 Claims, 4 Drawing Sheets

(52) U.S. Cl.
CPC ..... *B60W 2520/10* (2013.01); *B60W 2552/05* (2020.02); *B60W 2556/40* (2020.02)
(58) Field of Classification Search
CPC ......... B60W 2552/05; B60W 2556/40; B60W 2420/403; B60W 30/18154; B60W 60/0013; B60W 60/0015; B60W 2420/408; B60W 2552/10; B60W 2552/53; B60W 2554/4041; B60W 2554/406; B60W 2555/20; B60W 2555/60; B60W 2556/50; B60W 2720/10; B60W 2720/103; B60W 2720/106; B60W 30/18159; B60W 60/0011; G01C 21/3492
See application file for complete search history.

(56) References Cited

U.S. PATENT DOCUMENTS

| | | | | |
|---|---|---|---|---|
| 2018/0244275 | A1* | 8/2018 | Bremkens | B60W 30/18163 |
| 2018/0348767 | A1* | 12/2018 | Jafari Tafti | G08G 1/166 |
| 2019/0047571 | A1* | 2/2019 | Ulbrich | B60W 60/0027 |
| 2019/0054922 | A1* | 2/2019 | Yalla | B60W 10/20 |
| 2020/0339153 | A1* | 10/2020 | Zuo | B60W 60/0016 |
| 2021/0149396 | A1* | 5/2021 | Brickwedde | G05D 1/0214 |

OTHER PUBLICATIONS

Preliminary French Search Report dated Nov. 26, 2021 in French Application 2104645 filed on Aug. 29, 2022 (3 page, with Translation of Categories).
David Gonzalez Bautista. "Functional architecture for automated vehicles trajectory planning in complex environments" Apr. 3, 2017 (Apr. 3, 2017), 161 pages, XP055478016.
Lattarulo Ray et al. "Real-Time Trajectory Planning Method Based On N-Order Curve Optimization" 2020 24th International Conference on System Theory, Control and Computing (ICSTCC), IEEE, Oct. 8, 2020 (Oct. 8, 2020), pp. 751-756 DOI: 10.I 109/ICSTCC50638. 2020.9259787, XP033863051.

* cited by examiner

100

Autonomous Vehicle

10

Control System

2

Computing Unit

5

Perception System

Perception Means — 21

Processing Module — 22

3

Memory

7

Communication Interfaces

6

Local Memory

Microprocessor

Trajectory Module — 11

Situation Detection Module — 12

Optimization Module — 13

Control Module — 14

4

Motion Actuators

METHOD FOR CONTROLLING AN AUTONOMOUS VEHICLE

BACKGROUND

The invention relates to a method for controlling an autonomous vehicle. The invention further relates to a device for controlling an autonomous vehicle. The invention also relates to a computer program implementing the afore-mentioned method. Finally, the invention relates to a storage medium, on which such a program is stored.

Autonomous vehicle technologies essentially use high-definition maps, in association with speed profiles that meet the lateral and longitudinal constraint parameters of the autonomous vehicle, in order to predefine trajectories cor-responding to different autonomous driving scenarios in a given traffic zone.

For example, when an autonomous vehicle approaches an X-shaped intersection, the potential trajectories for approaching the intersection (turn right, turn left, go straight on) are already pre-mapped, as are the associated speed profiles.

However, these technologies have the disadvantage of being intrinsically limited to the traffic scenarios predefined from the maps.

Document U.S. Pat. No. 9,511,767 B1 discloses a method for controlling an autonomous vehicle using data originating from a perception system for adapting the trajectory of the autonomous vehicle as a function of the behavior of the surrounding vehicles. However, this solution has disadvan-tages.

BRIEF SUMMARY

The aim of the invention is to provide a device and a method for controlling an autonomous vehicle overcoming the aforementioned disadvantages and improving the devices and methods for controlling an autonomous vehicle that are known from the prior art. In particular, the aim of the invention is to provide a device and a method that are simple and reliable and that improve autonomous driving.

To this end, the invention relates to a method for control-ling an autonomous vehicle equipped with at least one perception means and a first map comprising stored digital data representing the actual infrastructure of the environ-ment of the autonomous vehicle. The control method com-prises:

a step of defining a first trajectory of the autonomous vehicle and a first associated kinematic profile;
  a step of detecting, from data transmitted by the at least one perception means, a situation to be optimized on a given segment of the first trajectory, the given segment being located in front of the autonomous vehicle, over a distance that is less than a maximum detection distance of the at least one perception means;
  a step of optimizing at least one element from among the first map and the first kinematic profile, optimizing the first map comprising determining a local map on the given segment, and/or
  optimizing the first kinematic profile comprising deter-mining a second kinematic profile associated with the given segment, with at least one parameter of the second kinematic profile being different from a param-eter of the first kinematic profile;
  a step of controlling the movement of the autonomous vehicle on the given segment taking into account the local map and/or the second kinematic profile.

Determining a local map can allow, notably by means of Bezier curves, a new curve of the given segment to be determined between an entry point and an exit point of the given segment, and the new curve can have a continuity G2 with the first trajectory at the entry point and at the exit point.

Determining a second kinematic profile associated with the given segment can comprise computing a maximum collision-free speed threshold from data originating from the at least one perception means and the second kinematic profile can comprise maximum speeds below the maximum collision-free speed threshold.

The maximum collision-free speed threshold can be com-puted by solving an equation in which the maximum colli-sion-free speed threshold is equal to the square root of the product of the braking value required to reach the maximum collision-free speed threshold by twice the maximum detec-tion distance of the at least one perception means.

The step of detecting a situation to be optimized com-prises measuring a holding time, during which the autono-mous vehicle remains in a situation to be optimized, and comparing the holding time with a triggering threshold associated with said situation, and the optimization step can be executed when the holding time is greater than the triggering threshold.

A set of predefined situations can be stored in an elec-tronic memory, and the step of detecting a situation to be optimized can comprise comparing a perception originating from the at least one perception means with the set of predefined situations.

The set of predefined situations can comprise negotiating a roundabout with two empty lanes, and/or entering a roundabout in dense traffic conditions, and/or two traffic lanes merging into a single lane, and/or crossing a grid-locked junction, and/or overtaking a very slow vehicle on a two-way road comprising a single lane in each direction.

The second kinematic profile can comprise a maximum speed at least 20% higher, and/or a maximum acceleration at least 200% higher, and/or a jerk at least 1,000% higher than the first kinematic profile.

The invention also relates to a device for controlling an autonomous vehicle, the autonomous vehicle being equipped with motion actuators. The device comprises hard-ware and/or software elements implementing the method as defined above, notably hardware and/or software elements designed to implement the method according to the inven-tion, and/or the device comprising means for implementing the method as defined above.

The invention further relates to an autonomous vehicle comprising a control device as claimed in the preceding claim.

The invention also relates to a computer program product comprising program code instructions stored on a computer-readable medium for implementing the steps of the method as defined above when said program operates on a computer. The invention also relates to a computer program product downloadable from a communication network and/or stored on a computer-readable data medium and/or that can be executed by a computer, comprising instructions which, when the program is executed by the computer, cause the computer to implement the method as defined above.

The invention also relates to a computer-readable data storage medium, which stores a computer program compris-ing program code instructions for implementing the method as defined above. The invention also relates to a computer-readable storage medium comprising instructions which, when they are executed by a computer, cause the computer to implement the method as defined above.

The invention further relates to a signal of a data medium conveying the computer program product as defined above.

BRIEF DESCRIPTION OF THE DRAWINGS

The appended drawings show, by way of an example, an embodiment of a control device according to the invention and a mode for executing a control method according to the invention.

DETAILED DESCRIPTION

Figures 1, 2:
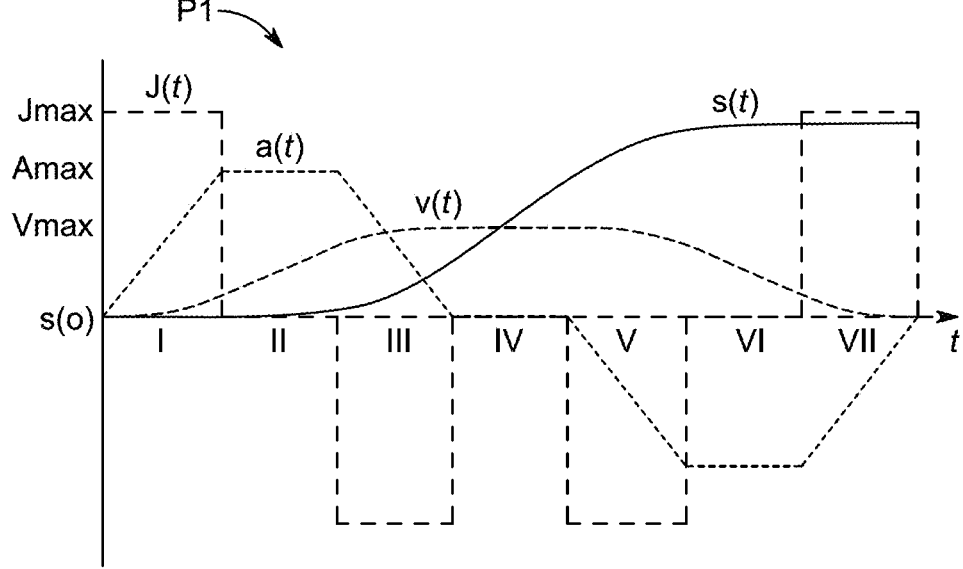
FIG. 1 shows an embodiment of an autonomous vehicle equipped with a control device.
FIG. 2 illustrates a mode for determining a kinematic profile of the autonomous vehicle according to the embodiment of the invention.

The autonomous vehicle 100 according to the embodiment of the invention can be any type of autonomous vehicle, notably a passenger vehicle, a utility vehicle, a truck or even a public transport vehicle such as a bus or a shuttle.

The autonomous vehicle 100 comprises a control system 10 and motion actuators 4.

The motion actuators 4 form part of the chassis of the autonomous vehicle 100. They notably comprise an engine torque actuator, a brake actuator and a rotation actuator for the steering wheels. The motion actuators 4 receive commands from the control system 10 in order to implement a movement of the autonomous vehicle along a trajectory determined by the control system 10.

The control system 10 mainly comprises the following elements:

- a perception system 2 comprising perception means 21 and a module 22 for processing the electronic horizon;
- an electronic memory 3; and
- a computing unit 5 comprising a microprocessor 1, a local electronic memory 6 and communication interfaces 7 allowing the microprocessor 1 to communicate with the perception system 2, and the motion actuators 4.

The perception means 21 can comprise all or some of the following equipment: a set of cameras and/or Lidars and/or radars. Alternatively or in addition, the perception means 21 could comprise inter-vehicle communication systems (V2V systems) or vehicle-to-everything communication systems (V2X systems) allowing the vehicles to exchange information with each other, with the infrastructures and with pedestrians.

Advantageously, the perception means 21 allow the environment located 360° around the autonomous vehicle 100 to be perceived.

In a preferred embodiment, the perception means 21 comprise five cameras and one Lidar. The images from the cameras are captured periodically and synchronously and are aggregated with the data originating from one rotation of the Lidar.

Based on the data originating from the perception means 21, the module 22 for processing the electronic horizon constructs a structured perception of the driving scene.

Periodically, notably each time data is received, the module 22 determines the maximum capacities of the perception system 2, i.e., a maximum detection distance DLIM of the perception means 21, which varies according to the driving scenario. For example, when the autonomous vehicle 100 travels on a highway the distance DLIM is greater than when it travels on a traffic circle intersection, commonly called "roundabout".

The distance DLIM also depends on other parameters, such as the weather conditions, the brightness, the presence of road infrastructure elements (for example, a tunnel), or the surrounding traffic (for example, a truck).

Throughout the remainder of the document, the term "roundabout" denotes a traffic circle intersection whereby the vehicles traveling on the intersection have priority over the vehicles entering the intersection. In addition, the maximum detection distance of the perception means is called "perception limit distance DLIM".

The perception limit distance DLIM can be determined from the perception limit of each perception means. In one embodiment, the perception limit distance DLIM is the minimum between the perception limit concerning the images originating from the cameras and the perception limit of the data originating from the Lidar.

The perception limit of the images originating from the cameras can be defined as the maximum distance below which the height of any object of interest (vehicle, pedestrian) is greater than a minimum threshold, for example, 25 pixels. The order of magnitude of this first limit is several tens of meters, for example, forty meters, under normal visibility conditions, notably in terms of the weather.

The perception limit of the data originating from the Lidar can be defined as the maximum distance below which the number of laser points reaching an object of interest (vehicle, pedestrian) is greater than a minimum threshold.

In a perception zone, defined by a circle centered on the autonomous vehicle and with a radius equal to the perception limit distance DLIM, the module 22 for processing the electronic horizon constructs an occupancy grid of the driving scene. The point clouds originating from the Lidar are discretized into cells to a certain extent. Each cell of the grid is determined to be free, occupied, or not determined. This determination is notably based on the processing of the height of the points of the cell, such as the application of minimum and maximum height thresholds of points in the cell.

The occupancy grid defines a zone without a collision risk around the position of the autonomous vehicle 100, as well as a three-dimensional representation of the obstacles located in the perception zone.

The data originating from the module 22 for processing the electronic horizon provides a structured perception of the driving scenario on the perception zone, notably a perception of the traffic surrounding the autonomous vehicle 100, in terms of traffic density and the position of the subjects of interest (vehicles, pedestrians).

The control system 10 further comprises an electronic memory 3, in which a set of digital data representing the actual infrastructure of the environment of the autonomous vehicle 100 is stored. This digital data generally relates to all the elements able to infer a choice in terms of driving the autonomous vehicle 100. They notably relate to the layout and the limits of the portions of navigable carriageways, the number of lanes of the portions of carriageways, the speed limits applicable to the portions of carriageways, the type of ground marking and their location, the presence and the position of traffic signs, traffic lights and roundabouts.

This digital data will simply be called "map M1" hereafter.

In the embodiment of the invention, the computer 1 allows software to be executed that comprises the following modules:

> a module 11 for determining a trajectory, which collaborates with the perception system 2 and the map 3;
> a module 12 for detecting a situation to be optimized, which collaborates with the perception system 2;
> an optimization module 13, which collaborates with the perception system 2;
> a module 14 for controlling the movement of the autonomous vehicle, which cooperates with the motion actuators 4.

Figure 3:
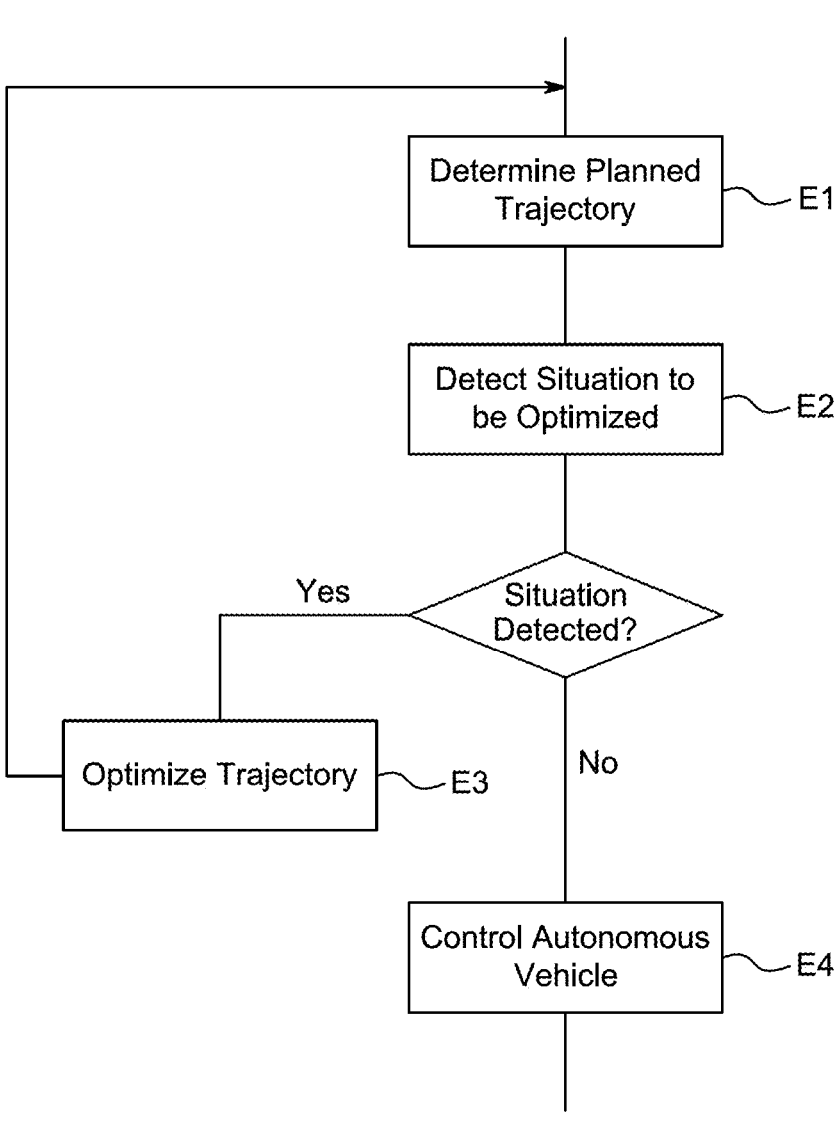
FIG. 3 shows a flowchart of a mode for executing a control method according to an embodiment of the invention.

A mode for executing the method for controlling an autonomous vehicle is described hereafter with reference to FIG. 3. The method comprises four steps E1 to E4.

In the first step E1, a planned trajectory T1 is determined between a starting point and an arrival point of the autonomous vehicle 100. To this end, the map M1 stored in the electronic memory 3 and the data originating from the perception system 2 are notably used.

Throughout the remainder of the document, the term "trajectory" is used to designate the temporal evolution of a state vector defining the features of the movement of the autonomous vehicle 100. In a preferred embodiment, the state vector comprises a position, notably coordinates x, y, longitudinal and lateral speeds and/or longitudinal and lateral accelerations and/or a yaw rate and/or a jerk. Throughout the remainder of the document, the term "position" is used to designate either the x, y coordinates of the state vector or the state vector as a whole.

The planned trajectory T1 is preferably divided into trajectory segments, also called "segments" throughout the remainder of the document.

Advantageously, the segments are each defined so as to be able to be fully located in the perception zone of the autonomous vehicle 100 when said vehicle enters the segment. Notably, the length of a segment is less than the perception limit distance DLIM.

The term "kinematic profile" is used throughout the remainder of the document to designate a generic speed, acceleration and jerk profile implemented by the vehicle. The kinematic profile to a certain extent acts as a template for computing the speeds, accelerations and jerks implemented in the trajectory computation. The template defined by the kinematic profile sets limits in terms of speed, acceleration and jerk.

The kinematic profile takes into account the constraints imposed by the road infrastructure: layout of the road, number of lanes, width of each lane, presence of an intersection and/or traffic light, speed limits, etc. It is also determined as a function of the technical features of the autonomous vehicle. It is further defined on the basis of driving comfort criteria, particularly relating to a maximum speed and/or lateral acceleration and/or jerk threshold.

In one embodiment, the kinematic profile can be defined according to a method for limiting jerk (with the jerk being the derivative of the acceleration) illustrated in FIG. 2.

FIG. 2 is a graph comprising three curves, J (t), a (t) and v(t), respectively representing the temporal evolution of the jerk, the acceleration and the speed of the autonomous vehicle 100.

The curve J(t) is a stepped curve: the time is divided into fixed duration intervals, and the value of the jerk is constant over each interval. The duration of the intervals depends on the acceleration limit of the vehicle and on the distance available for accelerating or braking.

In the illustrated example, the jerk can assume three discrete values: the zero value, a maximum value, Jmax, and a minimum value, −Jmax.

The value of Jmax is small so as to promote the comfort of the users of the autonomous vehicle 100. In one embodiment, the value of Jmax is set to 1 m/s$^{-3}$.

The curve J(t) thus determines the temporal evolution of the acceleration a(t):

> the curve a(t) is made up of linear segments, the slope of which is determined by the value of Jmax and the duration of the time intervals;
> it evolves between the acceleration values Amax and −Amax.

The curve a(t) determines the temporal evolution of the speed v(t) between a zero speed and a maximum speed Vmax, with Vmax being able to be determined by the speed limit relative to the trajectory segment.

This method is repeated on each trajectory segment in order to define a trajectory T1 in accordance with the road infrastructure, which is as comfortable as possible without slowing down traffic. Thus, for each trajectory segment, the applied speeds, accelerations and jerks are determined as a function of a kinematic profile and of the map M1.

Throughout the remainder of the document, the trajectory T1 is considered to be divided into N segments $S_1, \ldots, S_N$, with a first kinematic profile $P1_i$ being associated with each segment $S_i$, each of the first kinematic profiles $P1_i$ being defined as a function of the first map M1 and each of the segments $S_i$ being defined as a function of the first map M1 and of the first profile $P1_i$ associated therewith.

The term "trajectory segment" therefore equally designates the curve of the trajectory and also the speed, acceleration and jerk values applied in order to move the vehicle according to the curve of the segment.

Thus, given two distinct points C and D, two segments connecting point C to point D are considered to be different if their respective curves are different, or if the speed or acceleration or jerk values respectively applied in order to move the vehicle on the curve of either one of the segments are different. The trajectory T1 thus divided into trajectory segments is stored in the local memory 6 of the computing unit 5.

Step E2 then follows. In step E2, the intention is to detect a situation to be optimized on a segment $S_i$ of the trajectory T1 located in front of the autonomous vehicle 100, with the segment $S_i$ being entirely located within the perception limit DLIM of the perception means 21.

In other words, step E2 determines a segment $S_i$ of the trajectory T1 on which a situation to be optimized is located. The segment $S_i$ is located at the front of the vehicle, which means that the segment $S_i$ forms part of the trajectory T1 that the autonomous vehicle has not yet covered.

In the embodiment that is described, it is assumed that the situation to be optimized is limited to an isolated segment. In alternative embodiments, it could be considered that a situation to be optimized can extend over several consecutive trajectory segments. However, all the segments must be within the perception limit DLIM.

A situation to be optimized is a traffic scenario in which the movement of the autonomous vehicle is hindered by the first trajectory T1, notably by the limits of the first kinematic profile P1 associated with the trajectory T1, V1max and/or A1max and/or J1max. For example, in a dense traffic situation, the autonomous vehicle 100 can remain stuck at the entrance of a roundabout for a very long time if the kinematic profile associated with its trajectory does not allow it to accelerate enough in order to enter the traffic.

In other words, the kinematic profile P1 implemented by the trajectory T1 has been defined according to driving comfort criteria that limit the responsiveness of the autonomous vehicle. The profile P1 allows the autonomous vehicle to manage the vast majority of situations under optimal safety and comfort conditions. However, the profile P1 can prove unsuitable for certain situations. This unsuitability consequently can significantly slow down the vehicle, for example, when the vehicle cannot overtake a truck ahead of it, or even keep it stationary for a long time, for example, when the vehicle is unable to enter a roundabout due to the density of traffic.

Other situations to be optimized may relate not to the first kinematic profile P1 but rather to the first map M1 representing the actual infrastructure of the traffic environment of the autonomous vehicle 100. In some cases, the first map M1 induces a particular trajectory of a vehicle that does not correspond to the usual behavior of a human driver and that does not optimize driving. This is the case, for example, on a trajectory segment crossing a two-lane roundabout on which no other vehicle is traveling. The first trajectory T1 determines a movement on the outer lane of the roundabout, which requires a significant reduction in the speed of the autonomous vehicle before it enters the roundabout. The trajectory T1 has thus been defined with reference to the map M1 representing a roundabout comprising two lanes. However, when a human driver approaches a multi-lane roundabout on which no other vehicle is traveling, they adapt the trajectory of their vehicle to this situation: they anticipate the fact that they will decrease the curvature of their trajectory by using the two lanes, and therefore they approach the roundabout at a speed that is substantially greater than the speed they would use if they only traveled on the outer lane of the roundabout. The adaptation implemented by the human driver amounts to virtually modifying the road infrastructure, notably by considering that the roundabout comprises only one lane.

In a mode for executing the method, the data received from the perception system 2, notably the data originating from the module 22 for processing the electronic horizon, is compared with a set of predefined situations stored in the local electronic memory 6.

Throughout the remainder of the document:
the data originating from the module 22 for processing the electronic horizon is called "perception data";
the set of predefined situations stored in the local electronic memory 6 is called "situation table";
the data contained in the situation table and relating to a predefined situation is called "situation parameters".

The predefined situations correspond to situations to be optimized. It can include:
an entrance to a roundabout with two empty lanes, called "empty roundabout situation" throughout the remainder of the document; and/or
a prolonged stop at the entrance to a roundabout in dense traffic conditions, called "congested roundabout situation" throughout the remainder of the document; and/or
the merging of two traffic lanes into a single lane in gridlocked traffic conditions; and/or
a prolonged stop at a congested intersection; and/or remaining behind a very slow vehicle for a long time on a two-way road comprising a single lane in each direction.

Each of the predefined situations can be associated with one or more situation parameters, including road infrastructure elements and/or traffic density and/or a triggering threshold.

Thus, comparing the perception data with all the predefined situations can include comparing the road infrastructure elements taken by the trajectory T1 with the road infrastructure elements associated with each of the predefined situations. The road infrastructure elements can include, for example, a multi-lane roundabout, or an X-shaped intersection or a junction between two lanes, or a two-way road with one lane in each direction.

In addition, comparing between the perception data and the predefined situations can also include comparing traffic density originating from the perception data with a density threshold associated with each of the predefined situations. The density threshold associated with a predefined situation can be a minimum density threshold, for example, for the congested roundabout situation. The density threshold also can be a maximum threshold, for example, for the empty roundabout situation.

Furthermore, the situation parameters can include a "triggering" threshold corresponding to a minimum time for remaining in said situation. The minimum time for remaining in a situation varies according to the predefined situation. It can be zero, for example, for the empty roundabout situation. It can be of the order of one or more minutes for the congested roundabout situation.

Other situation parameters that are not described in this document can be contemplated.

A situation to be optimized is detected when all the situation parameters associated with this situation are checked, notably compared with the perception data.

If no situation to be optimized is detected, then step E4 follows, which step involves controlling the movement of the autonomous vehicle 100.

When a situation to be optimized is detected, then step E3 follows, which step involves optimizing the trajectory.

The trajectory is optimized by modifying the first map M1 and/or the first kinematic profile P1, notably the kinematic profile $P1_i$ associated with the segment $S_i$ on which the situation to be optimized is located.

Advantageously, the situation table associates at least one predefined optimization method with each predefined situation.

A predefined optimization method can be:
a map modification; or
a kinematic profile modification; or
a map and kinematic profile modification.

With respect to the empty roundabout situation, the situation table can associate it with a map modification involving creating a local map M2 converting the two-lane roundabout into a one-lane roundabout. Optionally, the situation table could, under certain traffic conditions, associate a map and kinematic profile modification with this situation.

In the case of the congested roundabout situation, the situation table can associate it with a kinematic profile modification and the computation of a new trajectory segment $S'_i$, the curve of which is superimposed on that of the segment $S_i$, and implementing a kinematic profile $P2_i$ comprising maximum speed and/or acceleration and/or jerk thresholds greater than those of the kinematic profile $P1_i$.

In a preferred embodiment, determining a second kinematic profile $P2_i$ comprises computing a maximum collision-free speed threshold VCOL on the basis of the data originating from the perception means 2, and the second kinematic profile P2$_i$ is defined so as to include speeds below the maximum collision-free speed threshold VCOL.

The threshold VCOL is the maximum speed at which the autonomous vehicle can move while having the possibility of stopping so as not to collide with the obstacles detected by the perception system 2.

The threshold VCOL is computed from the occupancy grid of the driving scene defined by the module 21 for processing the electronic horizon. The driving scene is used to determine which obstacles are closest to the autonomous vehicle 100, in particular the subjects of interest, such as other vehicles or pedestrians.

In a simplified embodiment, the threshold VCOL can be computed by solving the following equation Math1:

$$VCOL = \sqrt{2 \times A \times DLIM} \qquad \text{[Math 1]}$$

where:

A is an acceleration, notably the braking value required to reach the speed VCOL;

DLIM is the perception limit distance.

In order to determine the second kinematic profile P2$_i$, the previously described method for limiting jerk can be used. In this case, the increase in the responsiveness of the autonomous vehicle 100 will be obtained by setting the maximum speed threshold of the second profile P2$_i$ to a value Vmax2 that is both greater than the maximum speed threshold Vmax1 of the first profile P1$_i$ and less than the maximum collision-free speed VCOL. Advantageously, the maximum acceleration and/or jerk thresholds Amax2 and Jmax2 of the second profile are respectively greater than the Amax1 and Jmax1 thresholds of the first profile P1$_i$.

After determining a local map M2 and/or a second kinematic profile P2$_i$, the method returns to the step E1 of determining a trajectory in order to compute a second trajectory segment S'$_i$, or optimized segment S'$_i$, replacing the first trajectory segment S$_i$.

The optimized segment S'$_i$ is determined so as to be compatible with the local map M2 and/or the second kinematic profile P2$_i$.

The optimized segment S'$_i$ may have the same curve as the first segment S$_i$, notably when the map M1 has not been modified. However, they differ in terms of the speeds and/or accelerations and/or jerks that they implement.

The optimized segment S'$_i$ connects the entry and exit points A, B of the given segment S$_i$. The optimized segment S'$_i$ is advantageously determined so as to have a continuity G2, i.e., a continuity of curvature, between the various arcs forming it, but also a continuity of curvature at point A with the trajectory segment that precedes it, and a continuity of curvature at point B with the trajectory segment that follows it.

In one embodiment, the optimized segment S'$_i$ can be defined by a fifth-degree polynomial, notably using Bezier curves.

Step E4 then follows. In the fourth step E4, the movement of the autonomous vehicle is controlled according to the trajectory determined in the preceding steps, with this trajectory possibly comprising an optimized segment S'$_i$.

The trajectory is transmitted to the control laws of the autonomous vehicle 100, in order to be converted into command orders transmitted to the motion actuators 4 of the autonomous vehicle 100.

Figure 4:
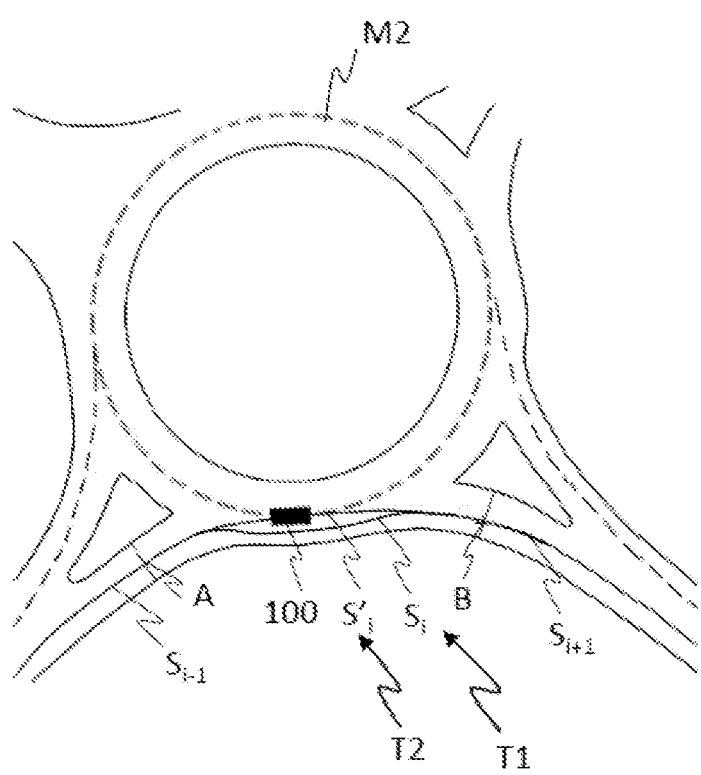
FIG. 4 illustrates a first example for implementing the control method according to the embodiment of the invention.
Figure 5:
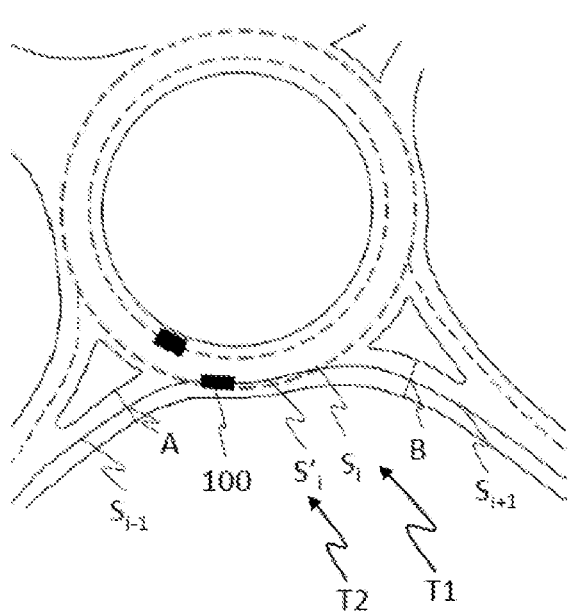
FIG. 5 illustrates a second example for implementing the control method according to the embodiment of the invention.

Two examples for implementing the control method are described in FIGS. 4 and 5. It should be noted that the position of the autonomous vehicle 100 in these figures represents the step E4 of moving the vehicle along the optimized trajectory.

FIG. 4 illustrates a first example for implementing the method. At an instant T, the autonomous vehicle 100 travels on a segment S$_{i-1}$ of a trajectory T1, with the trajectory T1 being computed as a function of a map M1 and of a kinematic profile P1. The following segment S$_i$ is entirely located in the perception zone, defined by the perception limit distance DLIM computed at the instant T. The following segment S$_i$ implements a movement on the outer lane of a roundabout. Without traffic on the roundabout, in step E2, an empty roundabout situation is detected. In step E3, the map M1 is locally modified by a local map M2 in order to replace the two-lane roundabout with a one-lane roundabout. Then a new trajectory S'i is computed in step E1 using the local map M2, with the new trajectory S'i connecting the entry point A of the segment S$_i$ to the exit point B of the segment S$_i$. In step E4, the autonomous vehicle 100 is controlled in order to move on the segment S'i between points A and B.

FIG. 5 illustrates a second example for implementing the method. In this second example, the following segment S$_i$ determines a movement on the outer lane of a roundabout. The traffic on the roundabout is dense, and the autonomous vehicle 100 must stop at the entrance to the roundabout. At the end of a given duration during which the autonomous vehicle is stationary at the entrance to the roundabout, in step E2, a congested roundabout situation is detected. In step E3, a new kinematic profile P2$_i$ is defined to facilitate the vehicle entering the roundabout. The kinematic profile P2$_i$ is then used in step E1 to determine the new segment S'$_i$ connecting points A and B. Segments S$_i$ and S'$_i$ follow the same curve but do not implement the same speeds and/or accelerations and/or jerks. In step E4, the autonomous vehicle 100 is controlled in order to move on the segment S'i between points A and B.

Finally, the control method according to the invention uses the perception means to detect a set of traffic scenarios and to optimize the trajectory of the autonomous vehicle according to the identified traffic scenario.

The trajectory optimization according to the invention implements two optimization levers that can be used independently of one another or simultaneously. A first optimization lever involves locally modifying the map representing the infrastructure of the identified traffic scenario. A second optimization lever involves temporarily increasing the responsiveness of the autonomous vehicle, by increasing the maximum speed and/or acceleration and/or jerk thresholds applied in its trajectory.

The optimization levers are determined as a function of the surrounding traffic, in order to avoid any collisions. A map modification preferably occurs in the absence of surrounding traffic. An increase in the responsiveness of the vehicle occurs under dense traffic conditions and takes into account a maximum collision-free speed computed from the data of the electronic horizon. Thus, the optimization of the trajectory occurs in safe conditions.

In addition to the reliability in terms of road safety, the invention has several advantages. Firstly, it reduces the risk of the autonomous vehicle being in a jammed situation due to high traffic density. By periodically increasing the responsiveness of the autonomous vehicle, it allows it to more easily enter dense traffic, while returning to an optimum driving comfort level once the entering maneuver is complete. Therefore, the invention promotes the fluidity of the traffic and the driving comfort by adapting the driving style of the autonomous vehicle to the surrounding traffic. More generally, in a set of given situations, the invention allows the autonomous vehicle to reproduce the optimization choices of a human driver confronted with these situations.

Thus, the invention allows the autonomous vehicle to adapt the responsiveness of its driving as a function of perception data relating to the static (infrastructure) and dynamic data (notably the traffic) of the driving scene. The driving fluidity of the autonomous vehicle is thus improved, notably jammed situations are avoided, while respecting driving safety.

The invention claimed is:

1. A method for controlling an autonomous vehicle equipped with at least one perception means and a first map comprising stored digital data representing an actual road infrastructure of an environment of the autonomous vehicle, the method comprising:

defining a first trajectory of the autonomous vehicle and a first associated kinematic profile;

detecting, from data transmitted by the at least one perception means, a situation to be optimized on a given segment of the first trajectory, the given segment being located in front of the autonomous vehicle, over a distance that is less than a maximum detection distance of the at least one perception means;

optimizing at least one element from the first map, the optimizing the at least one element from the first map comprising determining a local map on the given segment, the local map including a modified road infrastructure that replaces the actual road infrastructure in the given segment; and controlling a movement of the autonomous vehicle on the given segment taking into account the local map.

2. The control method as claimed in claim 1, wherein determining a local map allows, by means of Bezier curves, a new curve of the given segment to be determined between an entry point and an exit point of the given segment, and the new curve has a continuity with the first trajectory at the entry point and at the exit point.

3. The control method as claimed in claim 1, wherein the optimizing the at least one element includes optimizing the first kinematic profile, the optimizing the first kinematic profile includes determining a second kinematic profile associated with the given segment, with at least one parameter of the second kinematic profile being different from a parameter of the first kinematic profile, wherein the determining the second kinematic profile associated with the given segment comprises computing a maximum collision-free speed threshold from data originating from the at least one perception means and the second kinematic profile comprises maximum speeds below the maximum collision-free speed threshold.

4. The control method as claimed in claim 3, wherein the maximum collision-free speed threshold is computed by solving an equation in which the maximum collision-free speed threshold is equal to a square root of a product of a braking value required to reach the maximum collision-free speed threshold by twice the maximum detection distance of the at least one perception means.

5. The control method as claimed in claim 1, wherein the detecting the situation to be optimized comprises measuring a holding time, during which the autonomous vehicle remains in a situation to be optimized and comparing the holding time with a triggering threshold associated with said situation, and the optimization is executed when the holding time is greater than the triggering threshold.

6. The control method as claimed in claim 1, wherein a set of predefined situations is stored in an electronic memory, and the detecting the situation to be optimized comprises comparing a perception originating from the at least one perception means with the set of predefined situations.

7. The control method as claimed in claim 6, wherein the set of predefined situations comprises at least one of negotiating a roundabout with two empty lanes, entering a roundabout in dense traffic conditions, two traffic lanes merging into a single lane, crossing a gridlocked junction, and overtaking a very slow vehicle on a two-way road comprising a single lane in each direction.

8. The control method as claimed in claim 3, wherein the second kinematic profile comprises at least one of a maximum speed at least 20% higher, a maximum acceleration at least 200% higher, and a jerk at least 1,000% higher than the first kinematic profile.

9. A device for controlling an autonomous vehicle, the autonomous vehicle being equipped with motion actuators, the device comprising:

hardware and/or software elements configured to implement the control method as claimed in claim 1.

10. An autonomous vehicle, comprises:

the control device as claimed in claim 9.

11. A non-transitory computer-readable data storage medium storing a computer that, when executed by a computer, causes the computer to execute the control method as claimed in claim 1.

12. The control method as claimed in claim 1, wherein the at least one element from the first map is a two-lane roundabout on the first map that is modified to be a one-lane roundabout on the local map.

13. The control method as claimed in claim 1, wherein the actual road infrastructure on the first map includes a layout of navigable portions of the road, a number of lanes of the road, speed limits of the portions of the road, markings on the road and locations of the markings, traffic signs, traffic lights, and roundabouts.

* * * * *